United States Patent [19]

Malang

[11] Patent Number: 5,079,487
[45] Date of Patent: Jan. 7, 1992

[54] ANTI-BACKDRIVE COMMUTATION OF BRUSHLESS DC MOTORS

[75] Inventor: Keith W. Malang, Colorado Springs, Colo.

[73] Assignee: North America Philips Corporation, New York, N.Y.

[21] Appl. No.: 450,627

[22] Filed: Dec. 14, 1989

[51] Int. Cl.⁵ .............................................. H02K 29/08
[52] U.S. Cl. .................................. 318/254; 318/138; 318/701; 318/439
[58] Field of Search ................ 318/138, 254, 701, 439

[56] References Cited

U.S. PATENT DOCUMENTS

| 4,143,308 | 3/1979 | Deplante et al. | 318/701 |
| 4,703,236 | 10/1987 | Janssen | 318/138 |
| 4,740,734 | 4/1988 | Takeuchi et al. | 318/138 |
| 4,748,385 | 5/1988 | Van Hout | 318/138 |
| 4,870,332 | 9/1989 | Coghran et al. | 318/254 |

OTHER PUBLICATIONS

IPN WO 89/01260, "Switched Reluctance Motor Control System", 02/09/89, Miller et al.

Primary Examiner—William M. Shoop, Jr.
Assistant Examiner—John W. Cabeca

[57] ABSTRACT

The present invention provides an apparatus and method for commutating a brushless DC motor that prevents backdriving or spiking, due to energy stored in the coils of the bridge of the brushless DC motor, of a DC power supply providing current to the DC motor.

28 Claims, 15 Drawing Sheets

0 = "OFF"
1 = "ON"

| HALL SENSORS | | | DRIVER SELECTS | | | | | |
|---|---|---|---|---|---|---|---|---|
| C | B | A | AUP | ADN | BUP | BDN | CUP | CDN |
| 0 | 0 | 1 | 0 | 1 | 0 | 0 | 1 | 0 |
| 0 | 1 | 1 | 0 | 0 | 0 | 1 | 1 | 0 |
| 0 | 1 | 0 | 1 | 0 | 0 | 0 | 0 | 1 |
| 1 | 1 | 0 | 0 | 0 | 1 | 0 | 0 | 1 |
| 1 | 0 | 0 | 0 | 1 | 1 | 0 | 0 | 0 |
| 1 | 0 | 1 | 0 | 1 | 1 | 0 | 0 | 0 |

FIGURE 3

0 = "OFF"  0 = NON-REGULATING
1 = "ON"   1 = REGULATING

| HALL SENSORS | | | DRIVER SELECTS | | | | | | | |
|---|---|---|---|---|---|---|---|---|---|---|
| C | B | A | AUP | ADN | BUP | BDN | CUP | CDN | UP_CHOP | DN_CHOP |
| 0 | 0 | 1 | 0 | 1 | 0 | 0 | 1 | 0 | 1 | 0 |
| 0 | 1 | 1 | 0 | 0 | 0 | 1 | 1 | 0 | 0 | 1 |
| 0 | 1 | 0 | 1 | 0 | 0 | 1 | 0 | 0 | 1 | 0 |
| 1 | 1 | 0 | 1 | 0 | 0 | 0 | 0 | 1 | 0 | 1 |
| 1 | 0 | 0 | 0 | 0 | 1 | 0 | 0 | 1 | 1 | 0 |
| 1 | 0 | 1 | 0 | 1 | 1 | 0 | 0 | 0 | 0 | 1 |

CLOCKWISE ROTATION OF MOTOR

FIGURE 6A

|  |  |  | 0 = "OFF"<br>1 = "ON" |  |  |  |  |  | 0 = NON-REGULATING<br>1 = REGULATING |  |
|---|---|---|---|---|---|---|---|---|---|---|
| HALL SENSORS | | | | | | | | | | |
| C | B | A | AUP | ADN | BUP | BDN | CUP | CDN | UP_CHOP | DN_CHOP |
| 0 | 0 | 1 | 1 | 0 | 0 | 0 | 0 | 1 | 1 | 0 |
| 0 | 1 | 1 | 0 | 0 | 1 | 0 | 0 | 1 | 0 | 1 |
| 0 | 1 | 0 | 0 | 1 | 1 | 0 | 0 | 0 | 1 | 0 |
| 1 | 1 | 0 | 0 | 0 | 0 | 1 | 1 | 0 | 1 | 0 |
| 1 | 0 | 1 | 1 | 0 | 0 | 1 | 0 | 0 | 0 | 1 |

SENSOR ORDER (arrow indicating top-to-bottom order)

COUNTER CLOCKWISE ROTATION OF MOTOR

FIGURE 7

ANTI-BACKDRIVE COMMUTATION OF BRUSHLESS DC MOTORS

FIELD OF THE INVENTION

The present invention relates to brushless DC motors and, in particular, to a commutation apparatus and method incorporated in a brushless DC motor that prevents backdriving of the DC power supply providing current to the motor.

BACKGROUND OF THE INVENTION

Brushless DC motors are particularly suited for applications requiring high start-up torque and speed control. Exemplary of such an application is in a disk drive where a brushless DC motor is used to quickly bring a disk up to a rotational speed at which data can be transferred to or from the disk and, once at the defined rotational speed, to maintain the rotational speed for the duration of any data transfer.

Among the elements of a brushless DC motor is a bridge which is used to generate a commutated magnetic field. The bridge is typically comprised of a plurality of coils or windings that are electronically connected to one another such that current can flow in either direction through each coil or winding to produce the commutated magnetic field. The commutated magnetic field provides a unipolar torque for rotating a rotor. The commutated magnetic field is produced by first selecting one coil of the bridge to receive current from a DC power supply for a defined amount of time while "deselecting" or not providing current to the other coils of the bridge. In response to the current, the selected coil creates a stationary magnetic field. The stationary magnetic field is then, in effect, commutated by selecting another coil of the bridge to receive current from the supply for a defined amount of time while "deselecting" the previously selected coil and all other coils. The process of selecting and "deselecting" coils is known as commutation and the state of all of the coils, selected or deselected, during the defined amount of time when one of the coils is selected is known as a commutation state.

Included in a brushless DC motor, for control, is bridge drive circuitry that is used to select one coil and deselect all the other coils. Typically, switches located at the terminals of the coils comprise the driver circuitry. To select a particular coil, a switch located at each terminal of the coil to be selected is placed in an "ON" condition. In contrast, a coil is "de-selected" by placing at least one of the aforementioned switches associated with the coil in an "OFF" condition. In addition to being used to select a particular coil to receive current from the DC power supply, the switches are also used to regulate the current supplied to a selected coil which, in turn, controls the torque and, hence, the rotational speed of the motor. Typically, regulation of the current supplied to a selected coil is achieved by a switch mode regulation technique, like pulse width modulation or pulse amplitude modulation.

The brushless DC motor also includes a rotor for, among other things, providing a permanent magnetic field. Interaction of the permanent magnetic field produced by the rotor and the commutated magnetic field produced by the bridge causes rotation of the rotor.

The brushless DC motor also includes sensors for providing signals indicative of the location of the permanent magnetic field relative to the bridge. These signals allow a commutator to control the driver and, hence, the bridge so that the torque necessary to achieve rotation of the rotor is produced. The signals produced by the sensor are also indicative of the rotational speed of the rotor and, as such, are used to measure the rotational speed of the rotor.

Also included in the brushless DC motor, for control, is a commutator which generates, in response to the signals produced by the sensors, a signal or signals that are applied to the drive circuitry to commutate the coils of the bridge in a manner that interacts with the permanent magnetic field and thereby causes the rotor to turn. The commutator determines which switch or switches associated with a selected coil are to be used to regulate the current applied to the selected coil. As previously mentioned, regulation of the current provided to the coils of the bridge determines the torque delivered by the motor. Control of the torque, in turn, determines the speed of the motor for a given load.

Presently, the manner in which commutators control the driver circuitry and, hence, the bridge results in the DC power supply being forced to sink the current produced by a coil after it changes from a condition where it is being provided with current to a condition where it is not being provided with current. More specifically, when a coil is provided with current it establishes a magnetic field which, in essence, is an energy reservoir. When the coil is no longer being provided with current the magnetic field decays and, in so doing, generates a current in the coil. Forcing the DC power supply to sink current is commonly know as backdriving the power supply. Most, if not all, of the commercially available DC power supplies used with brushless DC motors are not designed to sink current. Consequently, backdriving of such a supply places the supply in non-specified mode of operation which, in turn, affects the operation of the motor. Moreover, backdriving of the supply generally forces the supply to shut itself and, consequently, the motor down. In addition, the backdrive signal produced by a coil produces electromagnetic interference (EMI) that adversely affects the performance of other circuitry in, for instance, a disk drive apparatus.

One of the situations where the control provided by presently known commutators results in backdriving of the DC power supply is where both switches associated with a selected coil are pulse width modulated, i.e. alternately "chopped ON" and "chopped OFF", to regulate the current provided to the selected coil by the power supply. Backdriving occurs in this situation, if both switches are "chopped OFF" at the same time during current regulation of the selected coil. Backdriving also occurs if pulse amplitude modulation, rather than pulse width modulation, is used to regulate the current.

To eliminate the backdriving that occurs during a commutation state when both switches associated with a selected coil are "chopped OFF" at the same time, commutators have been developed which use only one of the switches associated with a selected coil to regulate the current. Unfortunately, if the switch used to regulate current to a selected coil is also used to regulate the current to the coil that is selected in the subsequent commutation state, and if the switch is "chopped OFF" at the instant of commutation between the selected coils, then backdriving of the power supply occurs.

In an effort to eliminate all backdriving of the DC power supply due to energy stored in the coils of the bridge, series connected resistor-capacitors circuits have been connected in parallel with each of coils of the bridge. These series RC circuits are typically known as snubbers. While snubbers do absorb some of the current which would otherwise backdrive the DC power supply, a prohibitively large capacitor is required to prevent all backdriving of the supply due to energy stored in a coil. Unfortunately, snubbers also shunt some of the current which would otherwise be supplied to the selected coil during a commutation state. Consequently, there is power dissipation in the snubber which ages the snubber and reduces the efficiency of the motor, including the bridge driver circuitry.

Based on the foregoing, there is a need for an apparatus and method of commutating brushless DC motors that improves upon the known state of the art with respect to preventing backdriving of the DC power supply.

SUMMARY OF THE INVENTION

The present invention provides a method and apparatus for commutation of brushless DC motors that prevents backdriving, due to energy stored in the bridged motor coils, of a DC power supply sourcing the bridge. More specifically, the present invention provides a commutator that defines the regulation modes, either regulating or non-regulating, of the driver elements associated with the presently selected coil of the bridge such that the previously selected coil has a discharge path for the energy stored in its magnetic field that does not result in the backdriving of the DC power supply. The regulation states for a driver element associated with the presently selected coil depend upon whether the driver element is commutated between the previous and present commutation states, i.e., being "ON" during the previous commutation state and "OFF" during the present commutation state with a new driver element being turned "ON" during the present commutation state, or common, i.e., in an "ON" condition in both the previous commutation state and present commutation state. If a driver element is commutated between the previous commutation state and the present commutation state, then the commutator places the new driver element in a regulating mode for the present commutation state. If a driver element is common, or in an "ON" condition for both the previous and present commutation states, then the commutator places the driver element in a regulating mode in the previous commutation state and in a non-regulating mode in the present commutation state. By changing the regulating mode of the driver element that is common to the previous commutation state and the present commutation state from a regulating mode to a nonregulating mode a discharge path for the energy stored in the previously selected coil is provided that prevents backdriving of the DC power supply during commutation. Moreover, the aforementioned scenario results in one driver element being in a regulating mode and the other driver element being in a non-regulating mode during a commutation state. This prevents backdriving of the power supply for the duration of the commutation state. Consequently, the present invention prevents substantially all backdriving of the DC power supply due to energy stored in the bridged motor coils, i.e., backdriving occurring during commutation and during a given commutation state.

In embodiments of the invention employing a bridge where the coils are connected at nodes and there is an "UP" and a "DOWN" transistor associated with each node, backdriving is prevented, when "UP" transistors are commutated, by chopping or regulating the new "UP" transistor and saturating the common "DOWN" transistor. Similarly, when "DOWN" transistors are commutated, the new "DOWN" transistor is chopped and the common "UP" transistor is saturated. This prevents backdriving during a commutation state and during commutation.

BRIEF DESCRIPTION OF THE DRAWINGS

FIG. 3 is a table that illustrates the commutation signals output by the commutator shown in FIG. 1, in response to a position signal indicative of the location of the permanent magnetic field and provided by a series of Hall sensors, and applied to the bridge driver circuitry to achieve clockwise rotation of the rotor;

FIGS. 6A-6D illustrate a method and apparatus for commutating a brushless DC motor that prevents backdriving of the DC power supply by being selective as to which drive element in each commutation state is used to regulate current to the selected coil; and FIG. 7 illustrates the commutation signals output by the commutator to achieve counter-clockwise rotation of the rotor.

DETAILED DESCRIPTION OF THE INVENTION

Figure 1:
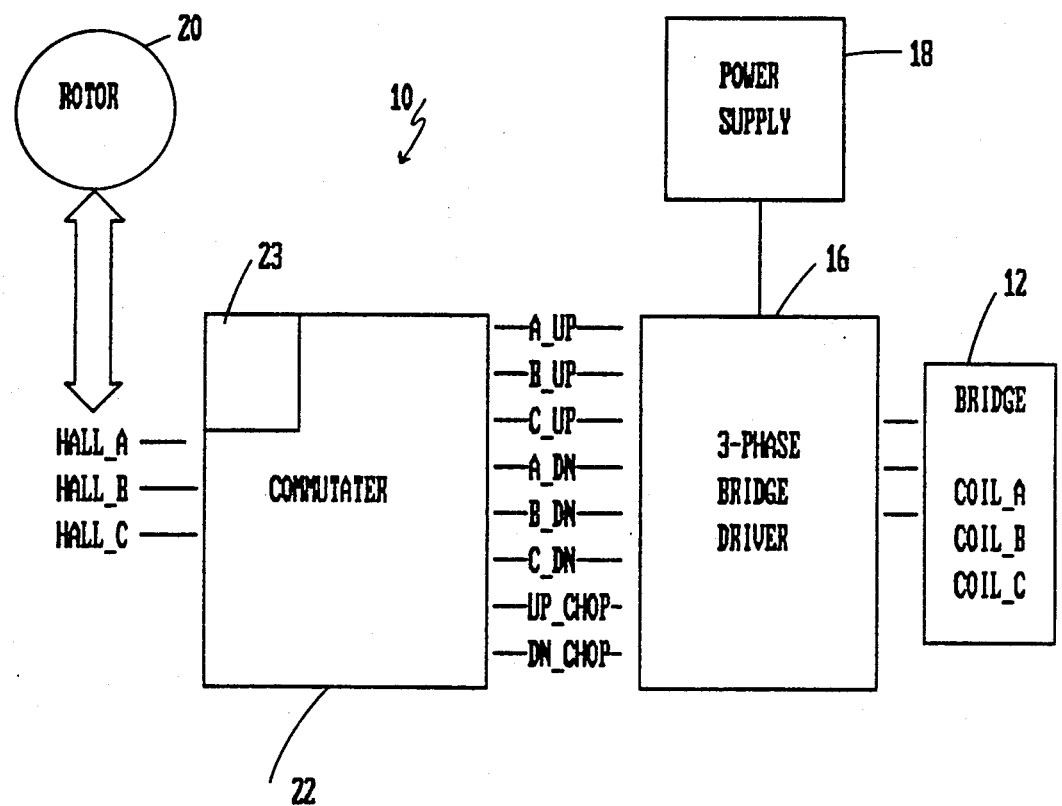
FIG. 1 is a general block diagram of a three-phase brushless DC motor and a DC power supply.
Figure 2:
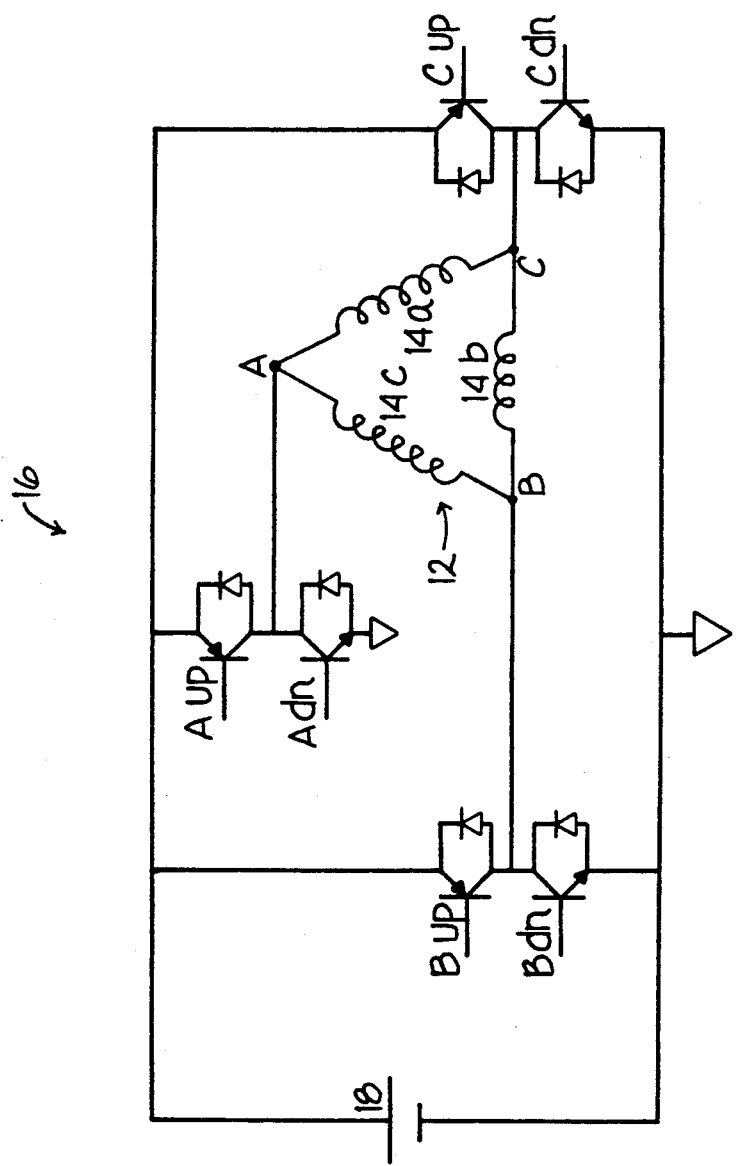
FIG. 2 is a detailed schematic diagram of the driver and bridge circuitry of the three-phase brushless DC motor shown in FIG. 1 together with a DC power supply.

With reference to FIGS. 1-2, an embodiment of a brushless DC motor 10, hereinafter referred to as motor 10, for preventing backdriving of a DC power supply is illustrated. The motor 10 includes a three-phase "delta" wound bridge 12, hereinafter referred to as bridge 12, for use in generating a commutated magnetic field. The bridge 12 includes three coils 14a-c that are connected to one another in a "delta" configuration having nodes A, B, C.

Also included in the motor 10 is a three-phase, full bridge driver 16, hereinafter referred to as driver 16, for applying current from a DC power supply 18 to the coils 14a-c of the bridge 12 in a sequence that results in the aforementioned commutated magnetic field. More specifically, the driver 16 is used to select which one of the coils 14a-c is to receive, and which of the coils 14a-c are not to receive, current from the DC power supply 18 in order to produce the commutated magnetic field. To produce the commutated magnetic field, the driver is used to select one of the coils 14a-c to receive current from the DC power supply 18 while "deselecting" or not providing current to the other coils for a defined amount of time. Upon receiving the current the selected coil produces a magnetic field. Commutation of the magnetic field is accomplished by using the driver 16 to select another coil of the bridge 12 to receive current from the DC power supply 18 and "deselect" the previously selected coil together with all of the other coils for a defined amount of time. The process of selecting and "deselecting" the coils 14a-c of the bridge 12 that are to receive and not receive current, respectively, from DC power supply 18 is known as commutation. The state of the coils 14a-c, i.e. selected or "deselected", during the defined amount of time when one of the coils 14a-c is selected is known as a commutation state.

The driver 16 includes switches $A_{up}$, $A_{dn}$, $B_{up}$, $B_{dn}$, $C_{up}$ and $C_{dn}$ which are associated with nodes A, B and C, respectively, for selecting and deselecting the coils. The driver 16 is a full bridge driver since two switches are associated with each node. Each of the switches $A_{up}$, $A_{dn}$, $B_{up}$, $B_{dn}$, $C_{up}$ and $C_{dn}$ has an "ON" selection state and an "OFF" selection state. When one of the switches $A_{up}$, $B_{up}$ or $C_{up}$ is in an "ON" selection state, the node with which it is associated is connected to the positive terminal of the DC power supply 18. Conversely, when one of the switches $A_{up}$, $B_{up}$ or $C_{up}$ is in an "OFF" selection state, the node with which it is associated is disconnected from the positive terminal of the DC power supply 18. Placing one of the switches $A_{dn}$, $B_{dn}$ or $C_{dn}$ in an "ON" selection state results in the node with which it is associated being connected to ground or the negative terminal of the power supply 18. Conversely, placing one of the switches $A_{dn}$, $B_{dn}$ or $C_{dn}$ in an "OFF" selection state disconnects the node with which it is associated from ground or the negative terminal of the power supply 18.

By placing the switches $A_{up}$, $A_{dn}$, $B_{up}$, $B_{dn}$, $C_{up}$ and $C_{dn}$ in the appropriate selection states, i.e. "ON" or "OFF" to select and "deselect" the coils 14a-c, and selecting and deselecting the coils 14a-c in the appropriate sequence, current from the DC power supply 18 is supplied to the coils 14a-c in a manner that produces the commutated magnetic field. For instance, suppose an initial magnetic field is established in coil 14a by placing switches $A_{up}$ and $C_{dn}$ in an "ON" selection state and the remaining switches in an "OFF" selection state. Commutation of the initial magnetic field is, in effect, accomplished by placing switch $A_{up}$ in an "OFF" selection state to deselect coil 14a and placing switch $B_{up}$ in an "ON" selection state together with leaving $C_{dn}$ in an "ON" selection state to select coil 14b.

Figure 8A:
FIGS. 8A and 8B illustrate a pulse width modulated signal and a pulse amplitude modulated signal, respectively.

The driver 16 is also used to regulate the current L provided by the DC power supply 18 to the coils 14a-c and, hence, control the torque and speed of the motor 10. Regulation is achieved by placing one of the two switches that are in an "ON" selection state in a regulating state, i.e. selecting one of these switches to act as a regulator. The switch that is an "ON" selection state with respect to the selected coil but not chosen to act as a regulator is placed in a nonregulating state. To summarize, during any commutation state, each switch of the driver 16 is in either an "ON" or "OFF" selection state and the two switches that are in an "ON" selection state are also in either a regulating or non-regulating state. The current to the selected coil is controlled by a pulse width modulation which involves, if necessary, alternately turning the switch in the regulating state "ON" and "OFF" for the duration of the commutation state. An example of a pulse width modulated signal is illustrated in FIG. 8A. For instance, if coil 14a is receiving current from the DC power supply 18 due to switches $A_{up}$ and $C_{dn}$ being in an "ON" selection state, then one of the switches $A_{up}$ and $C_{dn}$ is placed in a regulating state and pulse width modulated to regulate current from the power supply 18 to the coil 14a. To avoid confusion between the "ON" and "OFF" selection states and the turning "ON" and "OFF" of switch being used to pulse width regulate the current to the selected coil, the "ON" and "OFF" associated with pulse width modulation are hereinafter referred to as "chopped ON" and "chopped OFF".

Preferably, the switches $A_{up}$, $B_{up}$ and $C_{up}$ each include a PNP transistor having an emitter connected to the positive terminal of the power supply 18 and a collector connected to the corresponding node of the bridge 12. Switches $A_{dn}$, $B_{dn}$ and $C_{dn}$, in contrast, each preferably include a NPN transistor having an emitter connected to ground or the negative terminal of the power supply and a collector connected to the corresponding node. By controlling the voltage applied to the bases of the PNP and NPN transistors, the transistors and, hence, the switches $A_{up}$, $A_{dn}$, $B_{up}$, $B_{dn}$, $C_{up}$, and $C_{dn}$ can be placed in the appropriate selection state and used to regulate current. More specifically, the "ON" and "OFF" selection states of a switch are produced by applying the appropriate voltage to the base of the transistor to drive it into saturation and cutoff, respectively. Regulation is accomplished by pulse width or pulse amplitude modulation of the base of the transistor. A transistor that is in an "ON" selection state and is in a non-regulating state is simply saturated. Each of the switches $A_{up}$, $A_{dn}$, $B_{up}$, $B_{dn}$, $C_{up}$ and $C_{dn}$ also includes a flyback diode connected between its emitter and collector terminals to allow current to pass around the transistor with which it is associated when the transistor is in an "OFF" selection state.

The motor 10 also includes a rotor 20 which provides a rotating, permanent magnetic field that cooperates with the commutated magnetic field produced by the bridge 12 to cause rotation of the rotor 20.

Also included in the motor 10 are Hall sensors A, B and C for detecting the position or orientation of the permanent magnetic field associated with rotor 20 and generating a signal representative thereof.

The motor 10 further includes a commutator 22 for receiving the signal produced by the Hall sensors A, B, C and generating the commutation signals that are applied to the bases of the aforementioned transistors to place the switches $A_{up}$, $A_{dn}$, $B_{up}$, $B_{dn}$, $C_{up}$ and $C_{dn}$ in the appropriate selection state to achieve a commutating magnetic field that properly interacts with the permanent magnetic field of the rotor to provide torque to turn the rotor. FIG. 3 illustrates all of the possible signals produced by the Hall sensors A, B, and C and the corresponding commutation signals applied to the bases of the transistors associated with the switches $A_{up}$, $A_{dn}$, $B_{up}$, $B_{dn}$, $C_{up}$ and $C_{dn}$.

The commutator 22 also defines the regulating modes of the two switches that are in an "ON" state as either regulating or non-regulating.

It is believed useful at this point to discuss how known brushless DC motors backdrive a DC power supply. To facilitate the discussion, brushless DC motors having the same components as the motor 10 are employed. In addition, the reference numbers used to describe motor 10 are also used to describe these known brushless DC motors and how they backdrive a DC power supply.

Figure 4A:
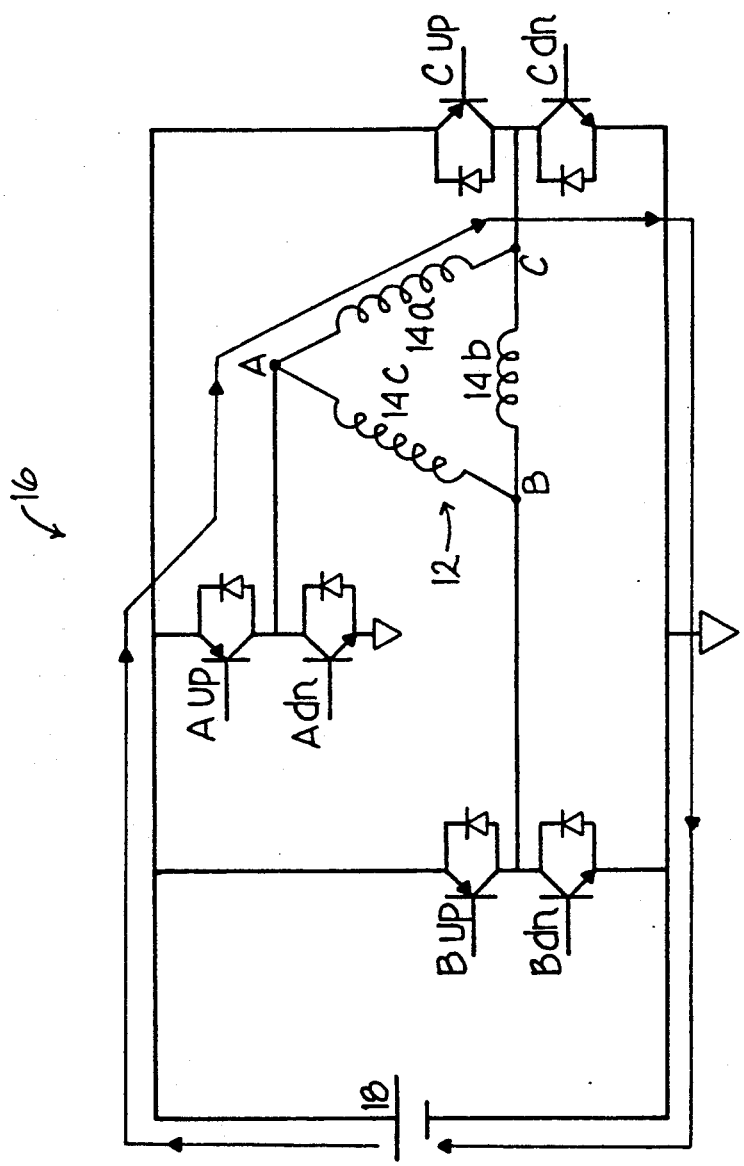
FIGS. 4A-4B illustrate backdriving of the power supply that results when both of the driver elements used to regulate current to a selected coil by pulse width modulation are both "chopped OFF" at the same time.
Figure 4B:
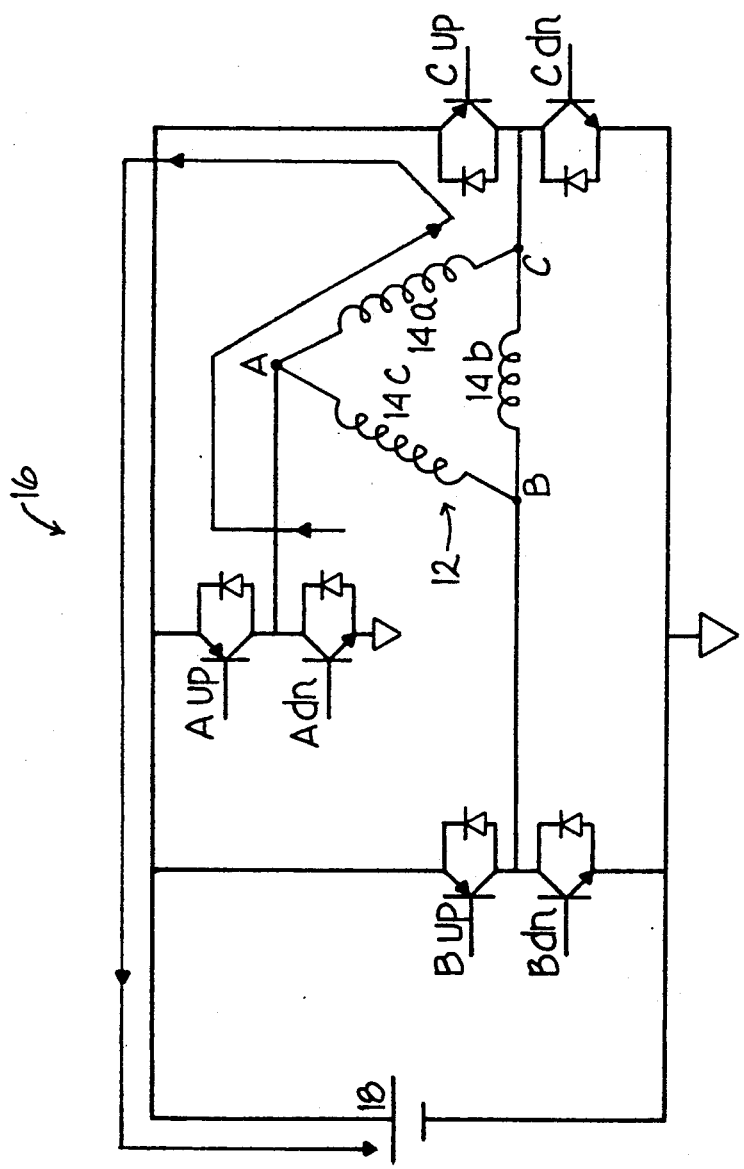

With reference to FIGS. 4AB, the bridge 12 and driver 16 of a known brushless DC motor together with a when the coil 14a is receiving current from the DC power supply 18 due to the $A_{up}$ and $C_{dn}$ switches being in the "ON" selection state. More specifically, current from the DC power supply is passing through the collector-emitter junction of the transistor associated with switch $A_{up}$, through the coil 14a, through the collector-emitter junction of the transistor associated with switch $C_{dn}$ and then back to ground. As previously discussed, the coil 14a responds to the current by establishing a magnetic field which stores energy. The commutator employed with this known brushless DC motor also defines both of the switches $A_{up}$ and $C_{dn}$ to be in a regulating mode and employs pulse width regulation. FIG. 4B illustrates the backdriving of the DC power supply 18 that occurs when both of the switches that are regulating the current to the coil 14a, switches $A_{up}$ and $C_{dn}$, are "chopped OFF" at the same time during the commutation state. To elaborate further, when the switches $A_{up}$ and $C_{dn}$ are "chopped OFF" at the same time the magnetic field produced by the coil 14a begins to decay and, in so doing, creates a current through the coil 14a. Unfortunately, the only path available to the current in the coil 14a established by the decay of its magnetic field results in backdriving of the DC power supply 18. More specifically, the path extends from ground, through the flyback diode associate with switch $A_{dn}$, through the coil 14a, through the flyback diode associated with switch $C_{up}$, and then into the positive terminal of DC power supply 18, thereby back-driving the supply. Consequently, if both of the switches in the "ON" selected state are also used to pulse width regulate current to the selected coil, then backdriving of the power supply occurs whenever both of these switches are "chopped OFF" at the same time.

Figure 5A:
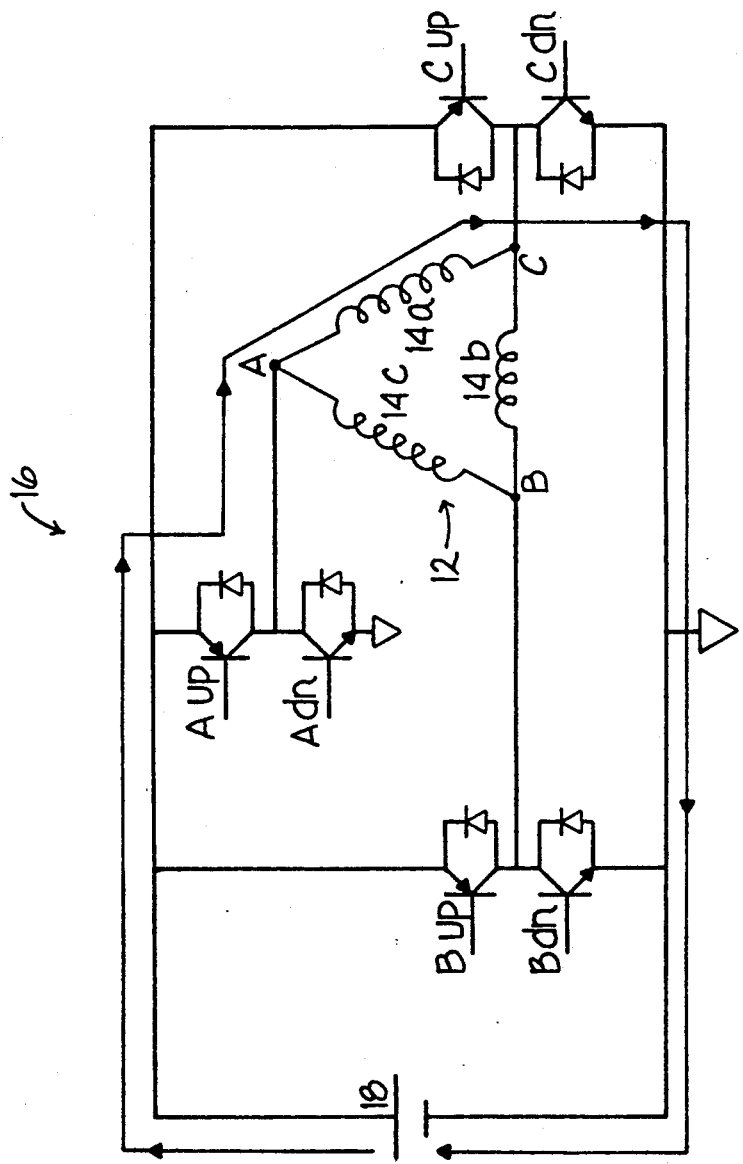
FIGS. 5A-5D illustrate backdriving of the power supply resulting from a driver element that is common to adjacent commutation states and that is pulsed width modulated to regulate current to the selected coils being switched "chopped OFF" at the time of commutation.
Figure 5B:
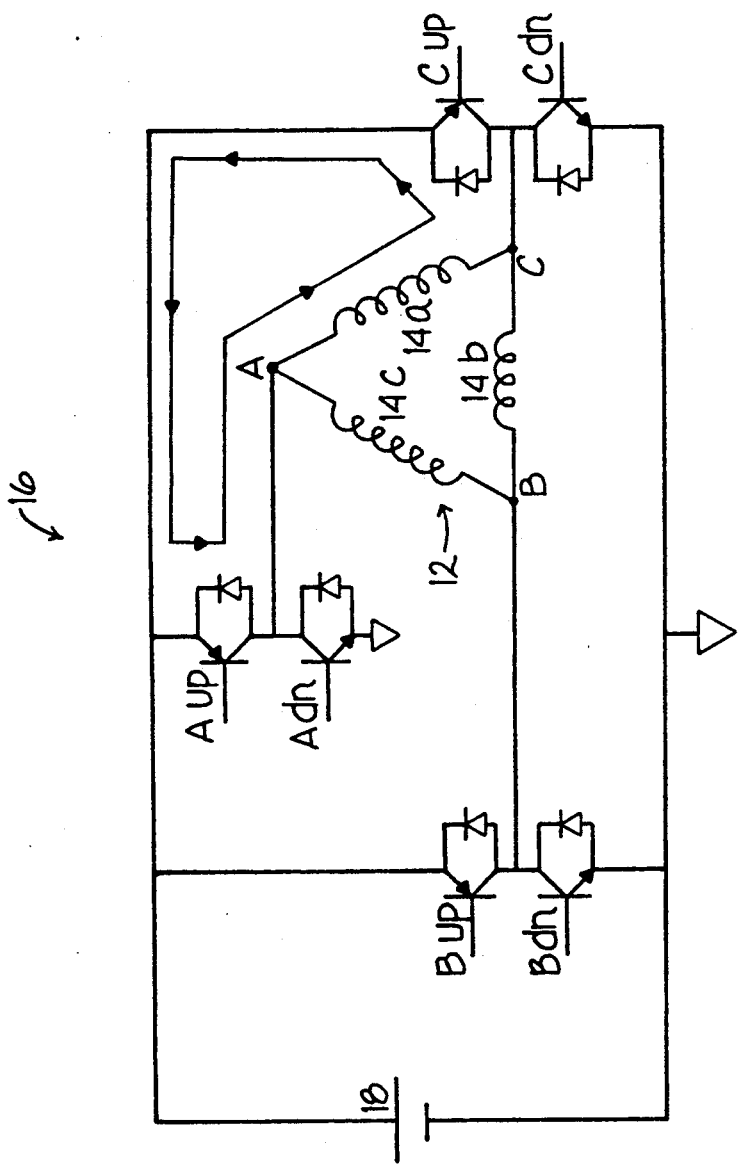

With reference to FIG. 5A, the bridge 12 and driver 16 of another known brushless DC motor together with a DC power supply are shown, as in FIG. 4A, when the coil 14a is receiving current from the DC power supply 18 due to the $A_{up}$ and $C_{dn}$ switches being in an "ON" selection state. The commutator employed by this known brushless DC motor, however, only places switch $C_{dn}$ in a regulating mode (switch $A_{up}$ is placed in a saturated state). Consequently, since only switch $C_{dn}$ can be chopped "OFF", the backdriving of the DC power supply that occurs when both switches are in a "chopped OFF" state, as illustrated in FIG. 4B, is eliminated. The elimination of this source of backdriving is illustrated in FIG. 5B, where the switch $C_{dn}$ is in an "chopped OFF" state. In this situation the current produced by the decay of the magnetic field associated with the coil 14a circulates, and is dissipated, in a loop defined by the coil 14a, the flyback diode associated with the switch $C_{up}$ and the emitter-collector junction of the transistor associated with the switch $A_{up}$.

Figure 5C:
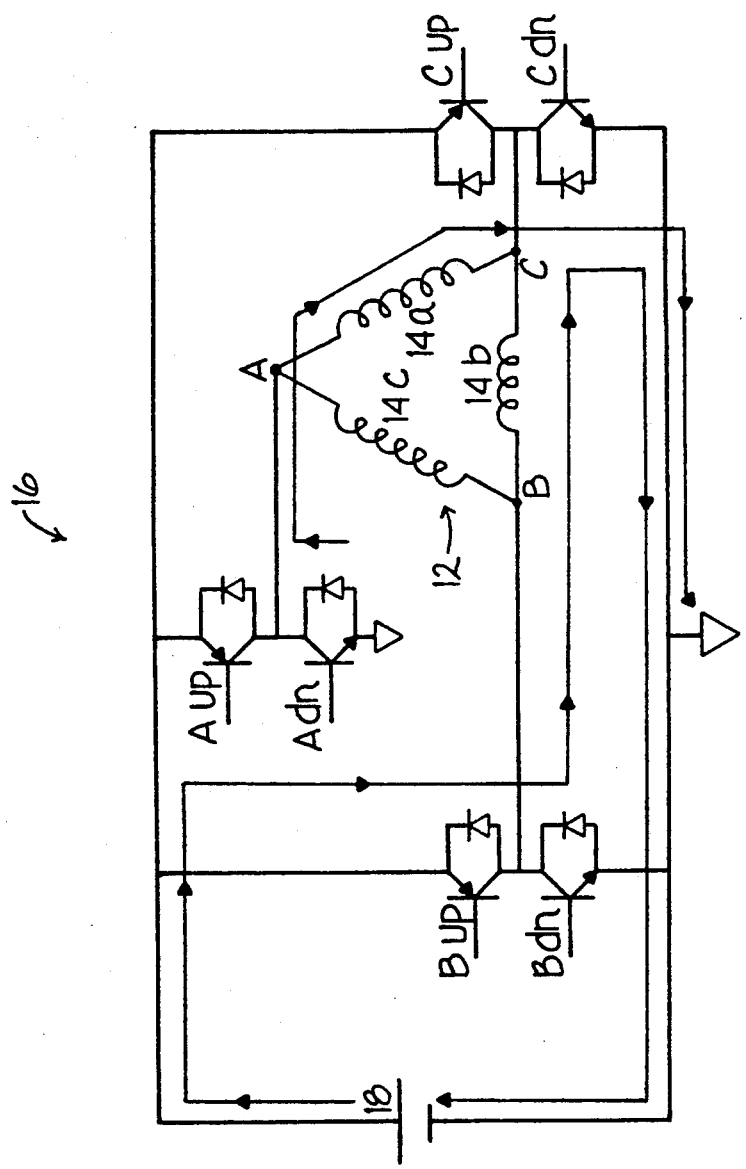

Even though the use of only one of the switches to regulate current eliminates the possibility of backdriving the DC power supply 18 during the commutation state, as illustrated in FIG. 4B, it does not eliminate the backdriving that occurs after a change in the commutation state that is attributable to the previously selected coil. Before illustrating the scenario that produces this type of backdriving, it is first necessary to illustrate the situation where there is a change in commutation state and the previously selected coil does not backdrive the DC power supply. With reference to FIG. 5C, the situation where the bridge 12 is commutated from a first commutation state, where the coil 14a is selected and the coil 14b is deselected, to a second commutation state, where the coil 14b is selected and the coil 14a is deselected, with no backdriving of the DC power supply 18 resulting 15 is illustrated. As shown in FIG. 3, the switch $C_{dn}$ is in an "ON" selected state during both the first and second commutation states. Consequently, switch $C_{dn}$ is common to the first and second commutation states. This known brushless DC motor also places the switch $C_{dn}$ in a regulating mode for both the first and second commutation states. FIG. 5C illustrates the situation where switch $C_{dn}$ is in a "chopped ON" state before and after commutation. In this situation, there is a path for the coil 14a to discharge the current that it produces following deselection that does not result in back driving of the DC power supply 18. Specifically, the discharge path extends from ground through the flyback diode associate with switch $A_{dn}$, through the coil 14a and back to ground through the collector-emitter junction of the transistor associated with switch $C_{dn}$.

Figure 5D:
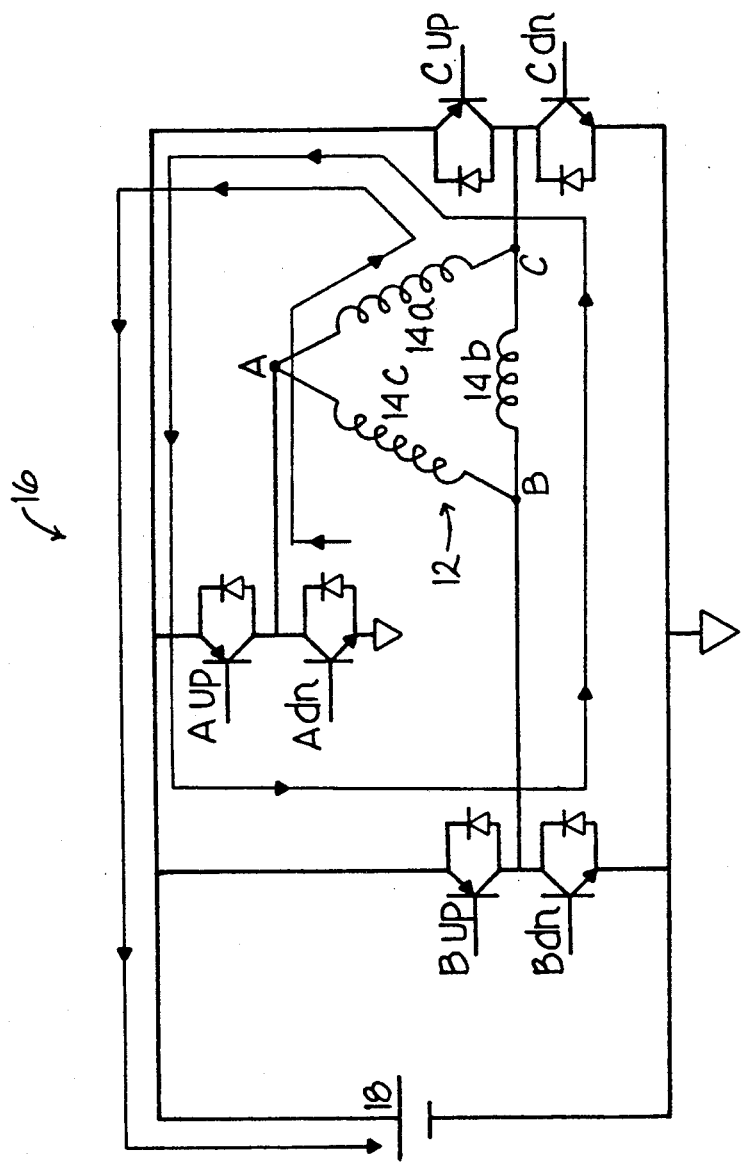

FIG. 5D, however, illustrates the situation where the bridge is commutated from a first commutation state, where the coil 14a is selected and the coil 14b is deselected, to a second commutation state, where the coil 14b is selected and the coil 14a is deselected, with backdriving of the DC power supply. In this situation the switch $C_{dn}$ is in a "chopped OFF" state at the time of commutation or enters the "chopped OFF" state after commutation but before the magnetic field in the coil 14a and the current established by its decay has a chance to dissipate. With $C_{dn}$ in a "chopped OFF" state, the current established by the decay of the magnetic field of the coil 14b is constrained by Kirchoff's current law to a loop defined by the emitter-collector junction of the transistor associated with switch $B_{up}$, the coil 14b and the flyback diode associated with switch $C_{up}$. Unfortunately, the current created by the decay of the magnetic field associated with the previously selected coil 14a is constrained to a path extending from ground through the flyback diode associated with switch $A_{dn}$, through coil 14a, through the flyback diode associated with switch $C_{up}$ and then to the positive terminal of the DC power supply 18 thereby backdriving it. The current produced by the decay of the magnetic field associated with the coil 14a cannot follow the path of the current associated with the coil 14b because this would violate Kirchoff's current law. Consequently, when only one switch is used to regulate the current to the selected coils of two adjacent commutation states there is still a backdriving problem.

Figure 6B:
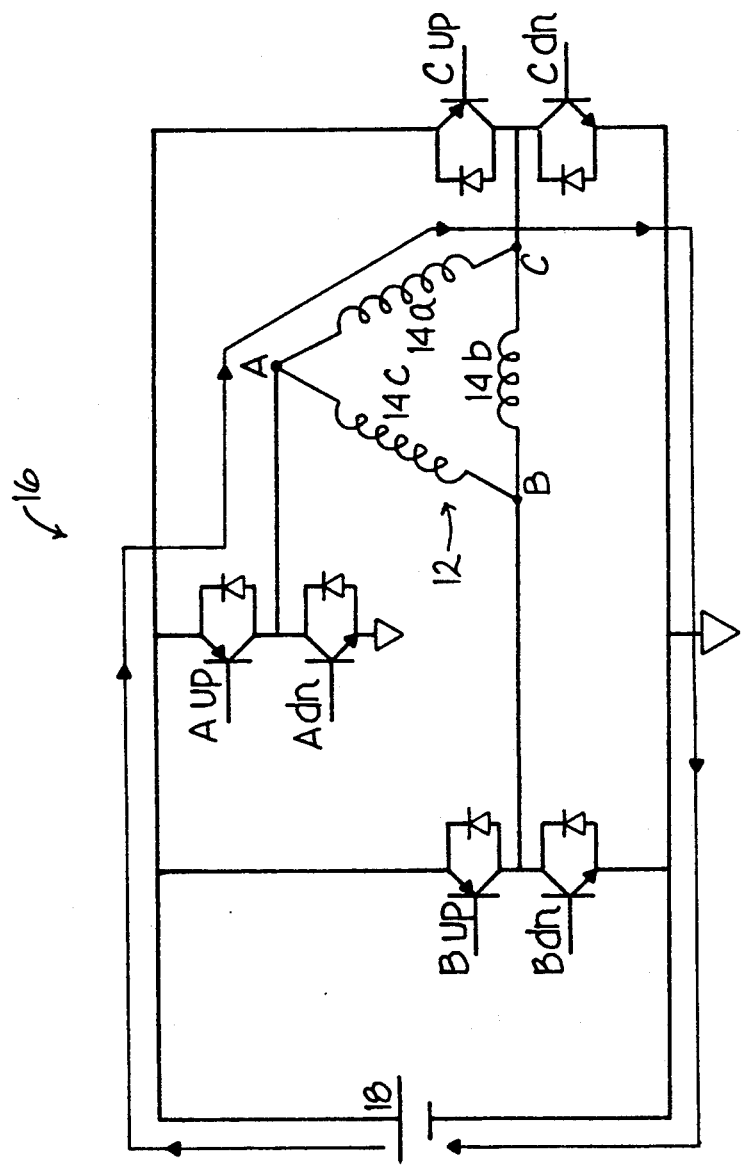
Figure 6C:
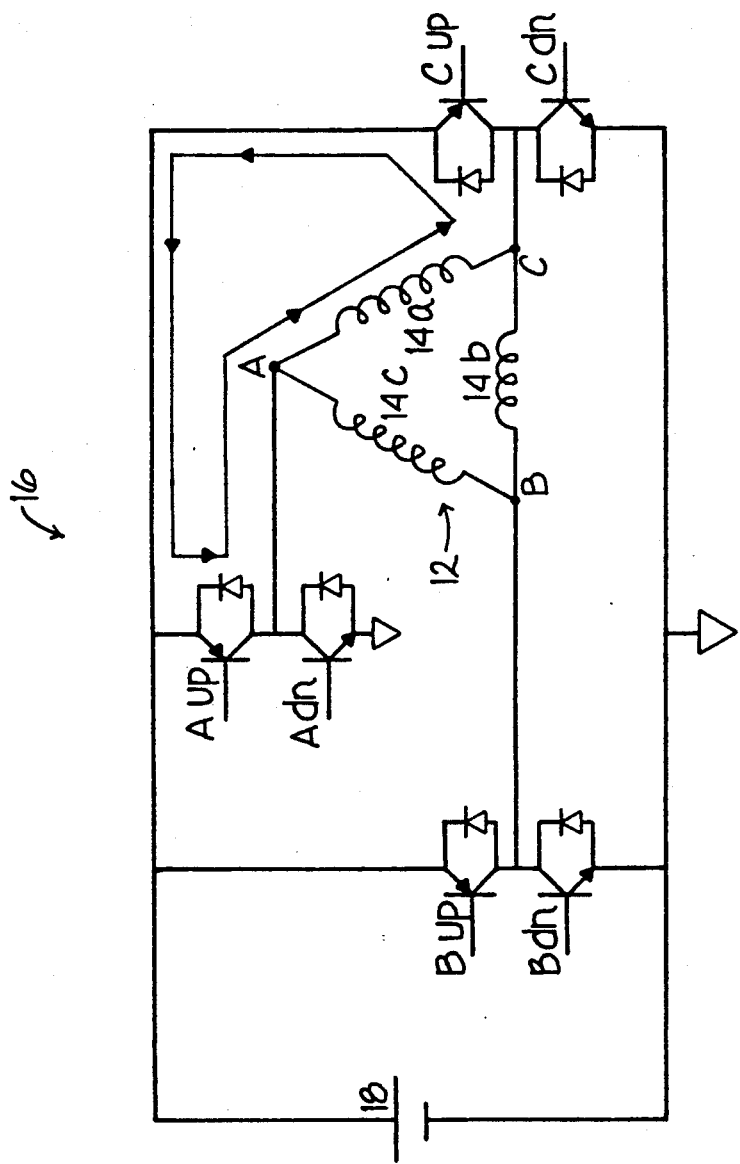

With reference to FIGS. 6A–D, the operation of the commutator 22 of the motor 10 in preventing backdriving of the DC power supply 18 is described with respect to a first commutation state and an immediately subsequent second commutation state. FIG. 6B illustrates the first commutation state where the coil 14a is receiving current from the DC power supply 18 and the coils 14b and 14c are not receiving current from the DC power supply 18. As shown in FIG. 6A, the commutator 22 turns "ON" switches $A_{up}$ and $C_{dn}$ and turns "OFF" switches $A_{dn}$, $B_{up}$, $B_{dn}$ and $C_{up}$ during the first commutation state. The commutator 22 also determines which one of the two "ON" switches is placed in a regulating mode and which one is in a saturated mode . In this instance and with reference to FIG. 6A, the commutator 22 places the switch $C_{dn}$ in a regulating mode and switch $A_{up}$ in a saturated mode. By placing only one of the two "ON" switches in a regulating mode and the other "ON" switch in a saturated mode, the coil 14a has a path to discharge the current produced by the decay of its magnetic field when the switch $C_{dn}$ is "chopped OFF" during the time when the coil 14a is selected. The path is illustrated in FIG. 6C and is defined by the coil 14a, the flyback diode associated with the switch $C_{up}$ and the emitter-collector junction of the transistor associated with switch $A_{up}$. Consequently, by using only one of the "ON" switches to regulate current to the selected coil during a commutation state, the commutator 22 prevents the type of backdriving illustrated in FIG. 4B.

Figure 6D:
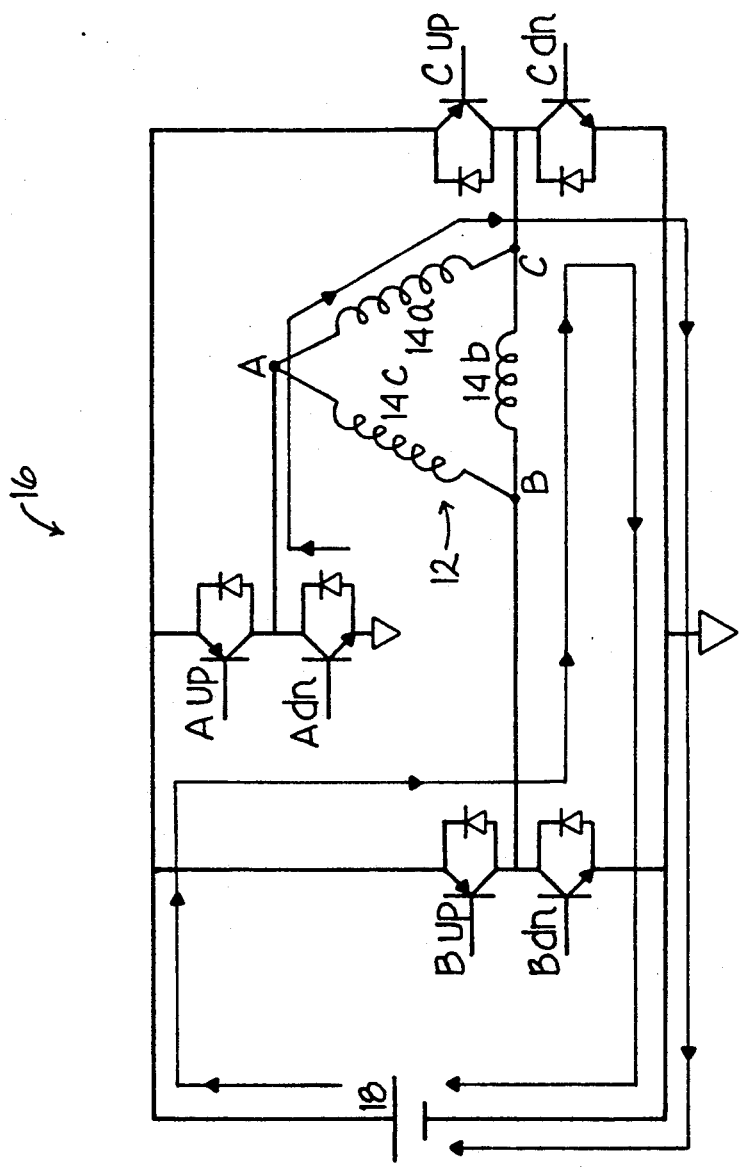

FIG. 6D illustrates the operation of the commutator 22 in preventing backdriving of the DC power supply 18 when the bridge 12 is commutated from the first commutation state, where the coil 14a is selected, to the subsequent, second commutation state, where the coil 14b is selected. As shown in FIG. 6A, the commutator 22 places the switches $A_{up}$ and $C_{dn}$ in an "ON" selection state and switches $A_{dn}$, $B_{up}$, $B_{dn}$ and $C_{up}$ in an "OFF" selection state during the first commutation state. During the second commutation state, the commutator 22 turns "ON" switch $B_{up}$, leaves switch $C_{dn}$ turned "ON", and turns "OFF" switches $A_{up}$, $A_{dn}$, $B_{dn}$ and $C_{up}$ as shown in FIG. 6A. Consequently, with respect to the state of the switches during the first commutation state and the immediately following second commutation state, the switch $C_{dn}$ is common to, or in an "ON" selection state in, both commutation states. Similarly, the "UP" switches are commutated, i.e., $A_{up}$ is turned "ON" during the first commutation state and "OFF" during the second commutation state with $B_{up}$ being turned "ON" during the second commutation state.

The commutator 22 also determines which one of the two "ON" switches is chosen as a regulating switch and which one is chosen as a saturated switch for each commutation state. In this example and with continued reference to FIG. 6A, the commutator 22 places the switch $C_{dn}$ in the regulating mode and switch $A_{up}$ in the saturated mode during the first commutation state. As previously mentioned, the use of only one switch to regulate the current to a selected coil during a commutation state prevents the type of backdriving illustrated in FIG. 4B. When the commutator 22 commutates the bridge 12 from the first commutation state to the second commutation state it places the switch $C_{dn}$ in a saturated mode and switch $B_{up}$ in a regulating mode. By changing the switch $C_{dn}$, which is common to the first and second commutation states, from a regulating to a saturated mode when the bridge 12 is commutated between the first and second commutation states, the current produced by the decay of the magnetic field associated with the coil 14a (the coil selected during the first commutation state), has a discharge path that does not backdrive the DC power supply 18. Specifically, the discharge path extends from ground, through the flyback diode associated with the switch $A_{dn}$, through the coil 14a and back to ground through the switch $C_{dn}$, which is "ON" and saturated. Consequently, by placing the switch that is common to adjacent commutation states in a regulating mode for the first commutation state and a non-regulating or saturated mode, i.e. in simply "ON" selection state, for the second commutation state, the commutator 22 prevents the type of backdriving illustrated in FIG. 5D. Consequently, backdriving is prevented during a given commutation state and during commutation.

More generally and with reference to the table in FIG. 6A, when "UP" switches ($A_{up}$, $B_{up}$ or $C_{up}$) are commutated and one of the "DOWN" switches ($A_{dn}$, $B_{dn}$ or $C_{dn}$) is common to adjacent commutation states the new "UP" switch is placed in a regulating mode and the common "DOWN" switch is saturated to prevent backdriving. Similarly, when "DOWN" switches are commutated and an "UP" switch is common to adjacent commutation states the new "DOWN" switch is placed in a regulating mode and the common "UP" switch is saturated to prevent backdriving.

The commutator 22 preferably employs a programmable logic device 23, such as a programmable logic array or a processor in combination with a look-up table, to implement the table shown in FIG. 6A. In either case the programmable logic array or the processor, based upon the signals provided by the Hall sensors A, B, and C, output the appropriate signals to establish the correct selection states in the switches $A_{up}$, $A_{dn}$, $B_{up}$, $B_{dn}$, $C_{up}$ and $C_{dn}$ to produce a commutated magnetic field that causes rotation of the rotor 20 and the regulation modes of the switches $A_{up}$, $A_{dn}$, $B_{up}$, $B_{dn}$, $C_{up}$ and $C_{dn}$ that prevent backdriving of the DC power supply due to energy stored in the coils 14a-c of the bridge 12.

Figure 8B:
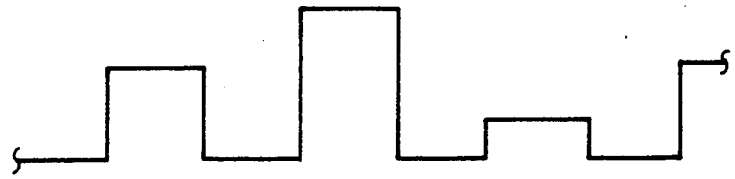

A number of variations of the present invention are possible. For instance, the present invention is applicable to all bridge phase and winding combinations. Consequently, the present invention can be used in a brushless DC motor having a three-phase, "Y" wound bridge. Furthermore, the operation of the motor 10 has been described with respect to a bridge that is used to produce a magnetic field that rotates in a clockwise direction. The commutator 22 can, however, be modified or programmed to prevent backdriving of the DC power supply 18 for rotation in the counter-clockwise direction. The modification simply involves modifying the pattern of "ON" and "OFF" switches for the commutation states as illustrated in FIG. 7. Changing the direction of the magnetic can be used to brake the motor 10. In addition, P-channel power MOSFETS can be substituted for the PNP transistors used in the driver 16 by connecting the sources to the positive terminal of the power supply 18, the drains to the nodes and the gates to the commutator 22. Similarly, N-channel power MOSFETS can be substituted for the NPN transistors used in the driver 16 by connecting sources to ground, drains to the nodes and gates to the commutator 22. In addition, the present invention is applicable to other forms of switch mode regulation, like pulse amplitude modulation, an example of which is illustrated in FIG. 8B. The invention is also applicable to brushless DC motors having Hall sensors that generate codes or signals other than those illustrated in FIGS. 3, 6A and 7, like "000" or "111", and/or produce the codes in a different sequence. Moreover, the back emf signal produced by the motor 10 can be used in place of the signals provided by the Hall sensors A, B, and C to index the commutation tables illustrated in FIGS. 6A and 7, for example.

The foregoing description of the invention has been presented for purposes of illustration and description. Further, the description is not intended to limit the invention to the form disclosed therein. Consequently, variations and modifications commensurate with the above teachings, and the skill or knowledge in the relevant art are within the scope of the present invention. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternative embodiments to the extent permitted by the prior art.

What is claimed is:

1. An apparatus for commutating a brushless DC motor that prevents backdriving of a DC power supply providing power to the brushless DC motor, wherein the brushless DC motor includes a bridge and a driver that has a plurality of means for use in selectively applying and selectively regulating the current provided by a DC power supply to the bridge, the apparatus comprising:
    means for receiving a position signal representative of the position of the permanent magnetic field associated with the rotor of the brushless DC motor;
    means, responsive to said position signal, for generating a commutation signal for the plurality of means for use in selectively applying and selectively regulating the current provided by the DC power supply to the bridge of the brushless DC motor, wherein said commutation signal includes a first portion for defining which of said plurality of means for use in selectively applying and selectively regulating are used to apply current from the DC power supply to the bridge during a commutation state and a second portion for defining which of said plurality of means for use in selectively applying and selectively regulating that are being used to apply current from the DC power supply to the bridge during said commutation state are used to regulate the current provided by the DC power supply to the bridge of the brushless DC motor; and
    means for applying said commutation signal to the plurality of means for use in selectively applying and selecting regulating;
    wherein said second portion of said commutation signal substantially prevents all backdriving of the DC power supply due to energy stored in the bridge of the brushless DC motor.

2. An apparatus, as claimed in claim 1, wherein:
    said means for generating includes a look-up table for storing a plurality of commutation signals, wherein one of said plurality of commutation signals is selected as said commutation signal based on said position signal.

3. An apparatus, as claimed in claim 1, wherein:
    said means for generating includes programmable logic means for generating said commutation signal based on said position signal.

4. An apparatus, as claimed in claim 1, wherein:
    said second portion of commutation signal causing a first of said plurality of means for use in selectively applying and selectively regulating that is used to apply current to the bridge of the brushless DC motor during a first commutation state and an immediately following second commutation state of the bridge of the brushless DC motor to change from regulating current to not regulating current from the DC power supply to the bridge of the brushless DC motor.

5. An apparatus, as claimed in claim 4, wherein:
    regulating current results in at least one of the following types of regulating signals being applied to said first of said plurality of means for use in selectively applying and selectively regulating: a pulse width modulated signal and a pulse amplitude modulated signal.

6. An apparatus, as claimed in claim 4, wherein:
    not regulating current from the DC power supply to the bridge of the brushless DC motor results in no regulation signal being applied to said first of said plurality of means for use in selectively applying and selectively regulating.

7. An apparatus, as claimed in claim 4, wherein:
    said second portion of said commutation signal causing a second of said plurality of means for use in selectively applying and selectively regulating that is used to apply current from the DC power supply to the bridge of the brushless DC motor in said second commutation state to regulate current from the DC power supply to the bridge of the brushless DC motor.

8. A method for commutating a brushless DC motor that prevents backdriving of a DC power supply providing power to the brushless DC motor, wherein the brushless DC motor includes a bridge, a driver that has a plurality of means for use in selectively applying and selectively regulating the current provided by a DC power supply to the bridge, and a rotor, the method comprising:
    receiving a position signal representative of the position of the permanent magnetic field associated with the rotor of the brushless DC motor;
    using said position signal to determine a commutation signal for the plurality of means for use in selectively applying and selectively regulating the current provided by the DC power supply to the bridge of the brushless DC motor, wherein said commutation signal includes a first portion for defining which of said plurality of means for use in selectively applying and selectively regulating are used to apply current from the DC power supply to the bridge during a commutation state and a second portion for defining which of said plurality of means for use in selectively applying and selectively regulating that are being used to apply current from the DC power supply to the bridge during said commutation state are used to regulate the current provided by the DC power supply to the bridge of the brushless DC motor wherein said second portion of said commutation signal substantially prevents all backdriving of the DC power supply due to energy stored in the bridge of the DC motor; and
    applying said commutation signal to the plurality of means for use in selectively applying and selectively regulating the current provided by the DC power supply to the bridge.

9. A method, as claimed in claim 8 wherein:
    said step of using includes indexing a look-up table containing a plurality of commutation signals with said position signal.

10. A method, as claimed in claim 8, wherein:
    said step of using includes inputting said position signal into a programmable logic means for generating said commutation signal.

11. A method, as claimed in claim 8, wherein:

said second portion of said commutation signal causing, during step of applying, a first of said plurality of means for use in selectively applying and selectively regulating that is used to apply current to said bridge of said brushless DC motor during a first commutation state and an immediately following second commutation state of the bridge of the brushless DC motor to change from regulating current from the DC power supply to the bridge of the brushless DC motor during said first commutation state to not regulating current from the DC power supply to the bridge of the brushless DC motor during said second commutation state.

12. A method, as claimed in claim 11, wherein:

regulating current during said first commutation state results in at least one of the following types of regulating signals being applied to said first of said plurality of means for use in selectively applying and selectively regulating: a pulse width modulated signal and a pulse amplitude modulated signal.

13. A method, as claimed in claim 11, wherein:

not regulating current from the DC power supply to the bridge of the brushless DC motor during said second commutation state results in no regulating signal being applied to said first of said plurality of means for use in selectively applying and selectively regulating.

14. A method, as claimed in claim 11, wherein:

said second portion of said commutation signal causing, during said step of applying, a second of said plurality of means for use in selectively applying and selectively regulating that is used to apply current from the DC power supply to the bridge of the brushless DC motor in said second commutation state to regulate current from the DC power supply to the bridge of the brushless DC motor.

15. A brushless DC motor for preventing backdriving of a DC power supply providing the brushless DC motor with power, comprising:

a bridge for use in generating a first magnetic field;

a driver for use in applying and regulating current from the DC power supply to said bridge, said driver including a driver element for use in applying current to said bridge during a first commutation state and to said bridge during a second commutation state immediately following said first commutation state, wherein said driver element is also used to regulate current from the DC power supply to said bridge during said first commutation state;

a rotor having a second magnetic field for interacting with said first magnetic field to cause rotation of said rotor;

means for sensing the position of said second magnetic field relative to said bridge and generating a position signal representative thereof; and means, responsive to said position signal, for providing a commutation signal to said driver to change the commutation state of said bridge from said first commutation state to said second commutation state, wherein said commutation signal includes a first portion for use in causing said driver element to apply current from the DC power supply to said bridge during said second commutation state and a second portion for use in causing said driver element to cease regulating current from the DC power supply to the bridge during said second commutation state to prevent backdriving of the power supply.

16. A brushless DC motor, as claimed in claim 15, wherein:

said first and second coils of said bridge are connected in one of the following: a "delta" configuration and a "Y" configuration.

17. A brushless DC motor, as claimed in claim 15, wherein:

said driver is a full driver having a first driver element and a second driver element associated with each of said first and second coils, wherein said full driver provides current to said first and second coils in either direction through said first and second coils.

18. A brushless DC motor, as claimed in claim 15, wherein:

said driver element includes switch means having an "ON" state and an "OFF" state where said driver element is used to apply current to said bridge when said switch means is in said "ON" state and is not used to apply current to said bridge when in said "OFF" state.

19. A brushless DC motor, as claimed in claim 15, wherein:

said driver element includes transistor means having a saturation state and a cutoff state, wherein said driver element is used to apply current to said bridge when said transistor means is in said saturation state and not used to apply current to said bridge when said transistor means is in said cutoff state.

20. A brushless DC motor, as claimed in claim 15, wherein:

said means for sensing includes a Hall sensor.

21. A brushless DC motor, as claimed in claim 15, wherein:

said means for commutating includes a look-up table containing a plurality of commutation signals, said look-up table indexed by said position signal.

22. A brushless DC motor, as claimed in claim 15, wherein:

said means for commutating includes a programmable logic device for generating said commutation signal based on said position signal.

23. A brushless DC motor, as claimed in claim 15, wherein:

regulating of current results in at least one of the following types of regulating signals being applied to said driver element: a pulse width modulated signal and a pulse amplitude modulated signal.

24. A brushless DC motor for preventing backdriving of a DC power supply providing current to the brushless DC motor, comprising:

a bridge for use in generating a first magnetic field;

a driver for use in applying and regulating current from the power supply to said bridge, said driver including first, second, and third switching transistor means, wherein said first and second switching transistor means apply current to said bridge during a first commutation state, said second switching transistor means also regulates current from the DC power supply to said bridge during said first commutation state, and said second and third switching transistor means apply current to said bridge during a second commutation state that immediately follows said first commutation state;

a rotor having a second magnetic field for interacting with said first magnetic field to cause rotation of said rotor;

Hall sensor means for sensing the position of said second magnetic field relative to said bridge and generating a position signal representative thereof; and means, responsive to said position signal, for providing a commutating signal to commutate said driver from said first commutation state to said second commutation state, wherein said commutation signal includes a first portion for use in causing said first switching transistor means to cease applying current to said bridge and said third switching transistor means to commence applying current to said bridge, and a second portion for use in causing said second switching transistor means to change from a switch-mode regulating condition to a saturated condition.

25. A method for commutating a brushless DC motor to prevent backdriving of a DC power supply providing current to the brushless DC motor, comprising:

providing a DC power supply;

providing a DC motor including:

a bridge for use in generating a first magnetic field;

a driver for use in applying and regulating current from said DC power supply to said bridge, said driver including a driver element for use in applying current to said bridge during a first commutation state and to said bridge during a second commutation state that immediately follows said first commutation state, wherein said driver element also regulates current from said DC power supply to said bridge during said first commutation state; and a rotor having a second magnetic field for interacting with said first magnetic field to cause rotation of said rotor;

sensing the position of said second magnetic field relative to said bridge and generating a position signal representative thereof; and commutating, in response to said position signal, said driver from said first commutation state to said second commutation state, wherein said step of commutating includes providing a commutation signal having a first portion for use in causing said driver element to apply current from the DC power supply to said bridge during said second commutation state and a second portion for use in causing said driver element to cease regulating current from the DC power supply to the bridge during said second commutation state to prevent backdriving of said power supply.

26. A method, as claimed in claim 25, wherein:

said step of commutating includes selecting one of a plurality of commutation signals contained in a lookup table using said position signal and applying said selected commutation signal to said driver.

27. A method, as claimed in claim 25, wherein:

said step of commutating includes inputting said position signal to a programmable logic device that outputs a commutation signal and applying said commutation signal to said driver.

28. A method for commutating a brushless DC motor to prevent backdriving of a power supply providing current to the brushless DC motor comprising:

providing a DC power supply;

providing a brushless DC motor, including:

a bridge for use in generating a first magnetic field;

a driver for use in applying and regulating current from said power supply to said bridge, said driver including first, second, and third transistor means, wherein said first and second transistor means apply current to said bridge during a first commutation state and said second and third transistors apply current to said bridge during a second commutation state; and a rotor having a second magnetic field for cooperating with the first magnetic field to cause rotation of said rotor;

sensing the position of said second magnetic field relative to said bridge and generating a position signal representative thereof;

providing, in response to said position signal, a commutation signal to commutate said driver from said first commutation state to said second commutation state, wherein said commutation signal includes a first portion for use in causing said first transistor means to cease applying current to said bridge and said third transistor means to commence applying current to said bridge, and a second portion for use in causing said second transistor means to change from a regulating condition to a saturated condition; and applying said commutation signal to said driver.

* * * * *